United States Patent Office 3,255,403
Patented June 7, 1966

3,255,403
VOLTAGE REGULATING SYSTEM
Roy L. Beaver and Robert L. McDonnell, Waynesboro, Va., assignors to General Electric Company, a corporation of New York
Filed Mar. 20, 1963, Ser. No. 266,688
5 Claims. (Cl. 323—43.5)

The invention relates to a voltage regulating system, and particularly to a voltage regulating system that provides a selectable regulated voltage from a voltage regulator capable of providing a regulated voltage of a designated value.

Various electrical devices require a plurality of selectable regulated voltages. For example, transformer testers may require a plurality of selectable voltages which are closely regulated. However, a given voltage regulator has designated characteristics or values which can be varied over only a limited range. A voltage regulator designed to provide a regulated output voltage of 120 volts may be adjusted to provide a regulated output voltage between 110 and 120 volts. Such a regulator utilizes a control voltage that operates on the regulator so that the regulator produces the designated output voltage of 120 volts (or the adjusted value) despite changes in the regulator input voltage and despite changes in the load on the regulator. But the limited range of such a regulator cannot provide all of the regulated voltages which may be needed in a given application. Thus, the transformer tester mentioned may require regulated voltages of any selectable value in a range from 1 to 999 volts. A single voltage regulator could not readily supply such a range of voltages.

Accordingly, an object of the invention is to provide an improved voltage regulating system that can supply regulated voltages over a relatively wide range.

Another object of the invention is to provide an improved voltage regulating system that extends the range of regulated output voltages which can be produced with a single voltage regulator.

Another object of the invention is to provide a voltage regulating system capable of providing a regulated voltage selected from a wide range of voltages.

Briefly, these and other objects of the invention are achieved with a supply voltage transformation device and a control voltage transformation device. The output of the supply transformation device is coupled to the output of a voltage regulator. The input to output ratio of the supply transformation device is arranged so that the output produces the desired regulated output voltage. This output is supplied to a utilization device, such as the transformer under test. This output is also supplied to the input of the control transformation device. The input to output ratio of the control transformation device is arranged so that the output produces the desired regulator control voltage. The output of the control transformation device is coupled back to the regulator and provides the control voltage for the regulator. It will thus be seen that the supply transformation device converts the designated output voltage of the regulator to any selectable regulated output voltage, and that the control transformation device converts the selected output voltage back to the designated voltage for controlling the regulator.

The invention is particularly pointed out in the claims. The invention may be better understood from the following description given in connection with the accompanying drawing, in which:

Figure 1:
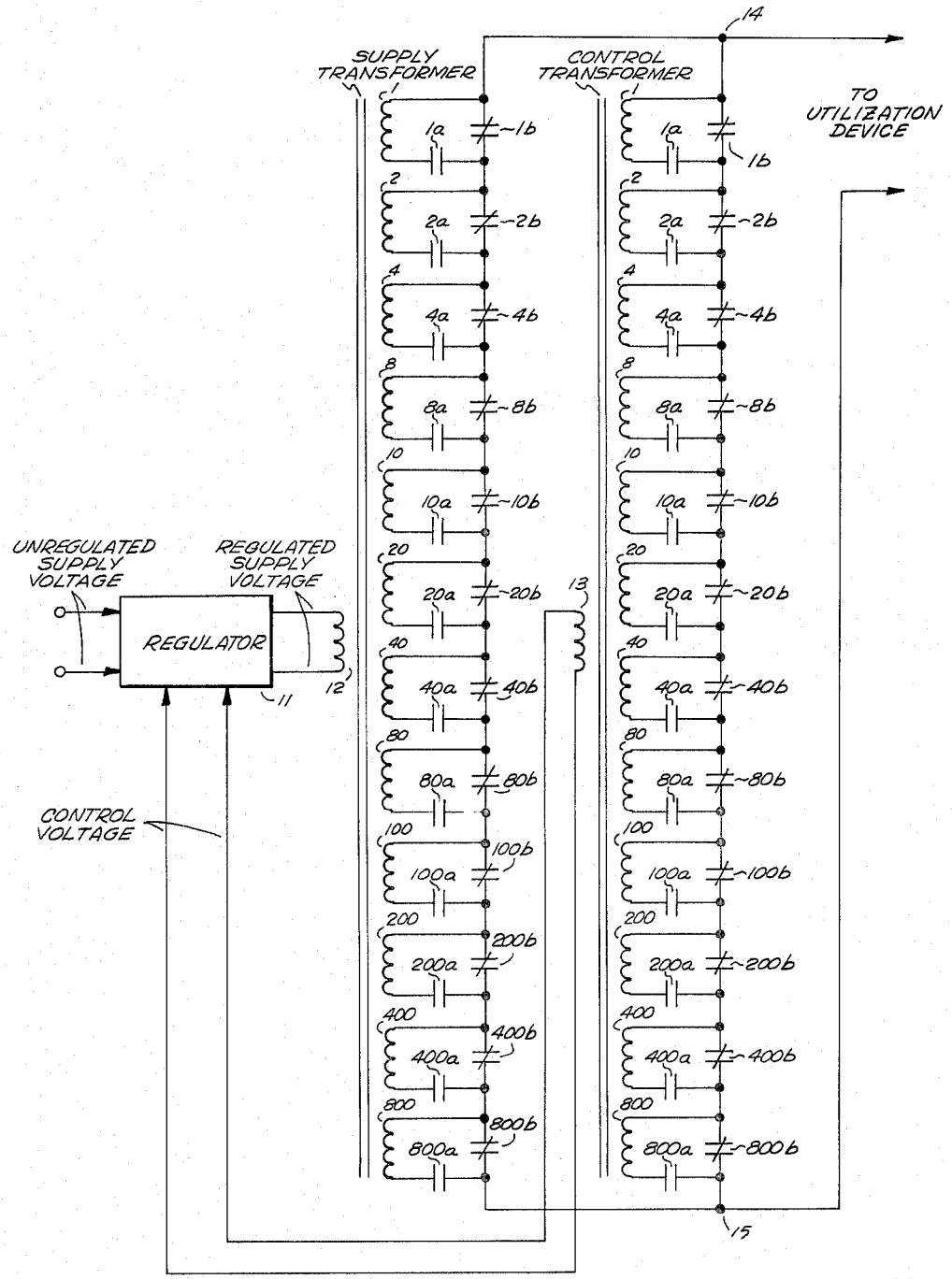
FIGURE 1 shows a schematic diagram of one embodiment of the invention.

In the embodiment of FIGURE 1, a regulator 11, in block diagram form, is used. The voltage regulator 11 is known in the art, such a regulator being described in an article entitled "A.-C. Voltage Regulators" by W. P. Carpenter that appeared in "Product Engineering" for February 1955, McGraw Hill Publishing Company, Inc., New York, N.Y. The voltage regulator 11 is supplied with an unregulated supply voltage, and provides a regulated supply voltage of a designated value. This regulated supply voltage is maintained at the designated value by means of a control voltage supplied to the regulator 11. As shown in the article mentioned, this control voltage is provided by the regulated supply voltage. The regulated supply voltage is normally fed back to the regulator 11 where it is compared with a reference voltage in an error detector. The error detector provides a signal which adjusts the regulator 11 so that the regulator 11 corrects the regulated supply voltage. If the regulated supply voltage increases (as a result of an increase in the unregulated supply voltage), the error signal through the regulator causes the regulated supply voltage to decrease. Conversely, if the regulated supply voltage decreases (as a result of a decrease in the unregulated supply voltage), the error signal through the regulator causes the regulated supply voltage to increase. Thus, the regulated supply voltage is maintained substantially at its designated value despite changes in the unregulated supply voltage. It is possible to vary the designated regulated supply voltage over a limited range. In a typical regulator designed to provide a regulated supply voltage of 120 volts, the regulator may be adjusted to provide a regulated output supply voltage between 110 and 120 volts.

The output of the regulator 11 is coupled to the primary winding 12 of a supply transformer. The supply transformer includes a plurality of output or secondary windings having reference numerals (1, 2, 4, 8, 10, 20, 40, 80, 100, 200, 400, 800) which, as an illustration, indicate the voltages supplied by the respective output windings. In the same illustration, the regulator 11 provides a regulated supply voltage of 120 volts, and utilizes a control voltage of 120 volts. In other words, in the illustration, a voltage of 120 volts on the primary winding 12 induces the indicated voltages in the respective secondary windings. Each of the supply transformer output windings is coupled in a series circuit with a set of normally open relay contacts having the same reference numeral as its respective winding followed by the letter *a*. Each series circuit of an output winding and its normally open set of relay contacts *a* is shunted by a set of normally closed relay contacts having the same reference numeral as its respective winding followed by the letter *b*. The sets of normally closed relay contacts *b* are coupled in series between output lines 14, 15. These output lines 14, 15 are coupled to a utilization device, such as, for example, a transformer which is being tested.

A control transformer is also provided. The control transformer includes a plurality of input or primary windings having reference numerals (1, 2, 4, 8, 10, 20, 40, 80, 100, 200, 400, 800) which, in the same illustration, indicate the voltages required for the respective input windings to cause the secondary or output winding 13 of the control transformer to produce a voltage of 120 volts. The control transformer input windings are also coupled in a series circuit with sets of respective normally open relay contacts having the same reference numeral as their respective windings followed by the letter *a*. Each series circuit of an input winding and its set of normally open relay contacts *a* is shunted by a set of normally closed relay contacts having the same reference numeral as its respective winding followed by the letter *b*. The sets of normally closed relay contacts $b$ are also coupled in series between the output lines 14, 15. The output winding 13 of the control transformer is coupled back to the regulator 11 and provides the control voltage therefor.

The various sets of relay contacts $a$, $b$ of corresponding windings of both transformers are operated by a respective and suitable relay coil (not shown). When a relay coil is energized (for example, the relay coil associated with the output winding 1 of the control transformer and the input winding 1 of the supply transformer), the sets of normally open relay contacts $1a$ of the control and the supply transformers are closed and the sets of normally closed relay contacts $1b$ of the control and the supply transformers are opened. This places the desired windings 1 of the control and the supply transformers in series between the output lines 14, 15. With windings having the values indicated, it is possible to select any desired regulated voltage in the range between 1 and 999 volts (actually up to 1665 volts, but the upper limit of 999 volts is used to conform with decimal systems) from the regulated voltage of 120 volts and to change the desired regulated voltage so selected back to the control voltage of 120 volts. With appropriate windings, other suitable ranges can be provided.

It will be seen that the supply transformer provides a selectable impedance or voltage transformation to provide the desired voltage across the output lines 14, 15. The control transformer provides the same selectable inverse impedance or voltage transformation to provide the desired voltage at the control input of the regulator 11. These transformations can be understood by the following examples. Assume that the regulator 11 produces a regulated supply voltage of 120 volts and that a regulated voltage of 440 volts is needed between the output lines 14, 15. For 440 volts, the relay coils associated with the windings 400 and the windings 40 of both transformers are energized. The contacts $400a$ and $40a$ are closed and the contacts $400b$ and $40b$ are opened in both the supply transformer and the control transformer. The supply transformer windings 400, 40 are effectively coupled between the output lines 14, 15, and 440 volts are produced. Similarly, the control transformer windings 400, 40 are effectively coupled between the output lines 14, 15, and the output winding 13 produces 120 volts. This 120 volts provides the control voltage for the regulator 11 and enables the regulator 11 to maintain its regulated supply output voltage at its designated 120 volts. Other regulated voltages, for example less than 120 volts, may likewise be provided. Whatever voltage is provided by the supply transformer as a result of the selective coupling of the supply transformer output windings is transformed to the proper regulator control voltage by a comparable but inverse transformation by the control transformer. Thus, if the supply transformer steps the regulated supply voltage up, the control transformer steps this regulated voltage back down to the designated control voltage. If the supply voltage transformer steps the regulated supply voltage down, the control transformer steps the regulated voltage back up to the designated control voltage value. Thus, the regulator operates as though it were providing its designated regulated supply voltage, but the impedance or voltage transformations provided by the invention enable any voltage to be selected and regulated.

Figure 2:
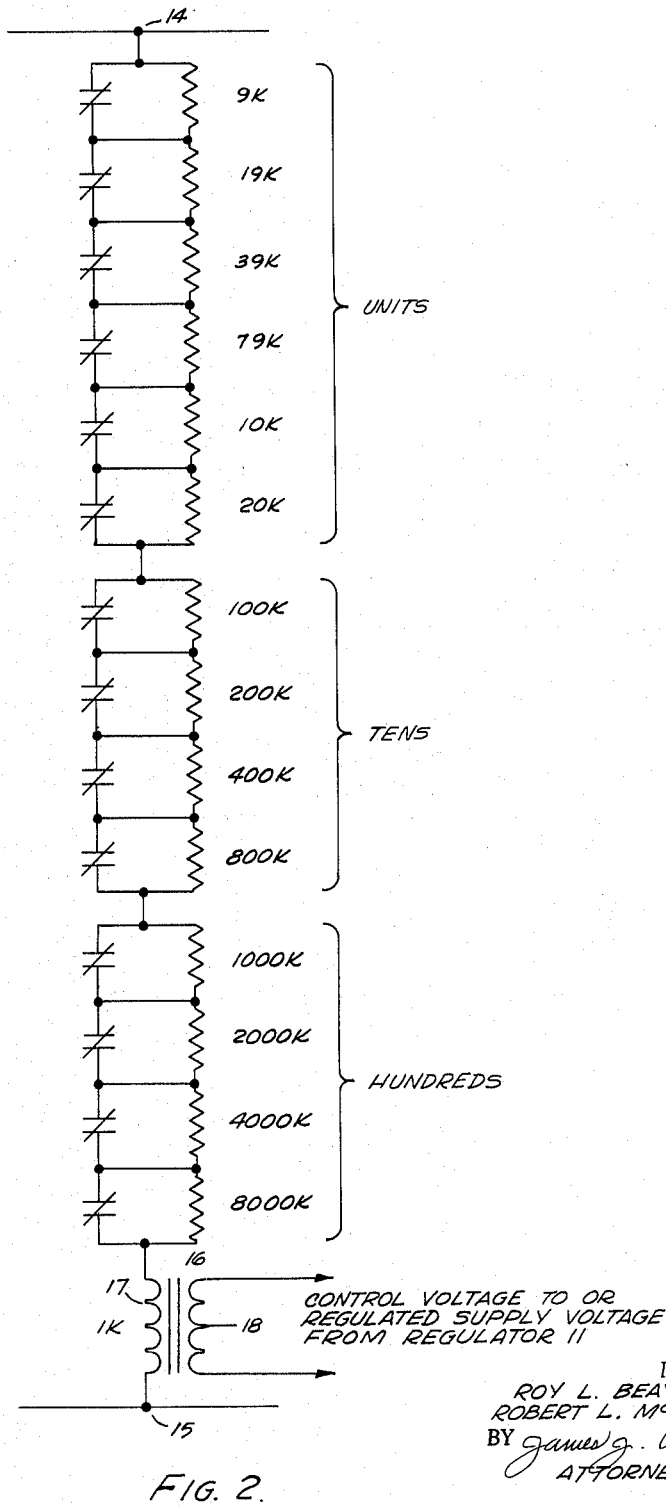
FIGURE 2 shows a schematic diagram of a modification of the embodiment shown in FIGURE 1.

FIGURE 2 shows a resistor and transformer network which may be utilized in place of the supply transformer, or in place of the control transformer, or in place of both the supply and control transformers shown in FIGURE 1. The network shown in FIGURE 2 includes a plurality of units, tens, and hundreds decades resistors having designated values of a number followed by the letter K, where K indicates 1000 ohms. The units decade resistors include 9K, 19K, 39K, 79K, 10K, and 20K values. The tens decade resistors include 100K, 200K, 400K, and 800K values. The hundreds decade resistors include 1000K, 2000K, 4000K, and 8000K values. The resistors are coupled in series, and each resistor is shunted by a set of normally closed contacts. The network is also provided with a 1K winding 17 of a transformer 16. The transformer 16 has a winding 18 coupled to the winding 17 in any transformation ratio desired. As an example, it has been assumed that one-tenth of a volt across the 1K winding 17 produces 120 volts across the winding 18, and 120 volts across the winding 18 produces one-tenth of a volt across the 1K winding 17. One-tenth of a volt is provided across the winding 17 in response to a current 0.1 milliampere through the 1K winding 17. This is the desired current through the resistor network for all voltages across the output lines 14, 15. The values of the resistors in the units, tens, and hundreds decades with the 1K winding 17 permit a series resistance between the output lines 14, 15 of any value between 1K and 10,000K (actually more, but the upper limit of 10,000K is used to conform with decimal systems). If the voltage across the output lines 14, 15 is seven volts or is to be seven volts, then the sets of contacts associated with the resistors 39K, 10K, and 20K are opened. This provides 39K, 10K, 20K, and 1K, or a total resistance of 70K. With a voltage of seven volts across the output lines 14, 15, this results in the desired current of 0.1 milliampere through the resistors and the 1K winding 17. This produces 120 volts across the winding 18. And if 120 volts is applied to the winding 18, a current of 0.1 milliampere flows through the resistors and the 1K winding (totalling 70K) to produce seven volts across the output lines 14, 15. If the voltage across the output lines 14, 15 is 673 volts or is to be 673 volts, then the sets of contacts associated with resistors 4000K, 2000K, 600K, 100K, 20K, and 9K are opened, this providing a total of 6,729K. This 6,729K plus 1K provides a total of 6,730K which, with an applied voltage of 673 volts, provides the desired current of 0.1 milliampere. And if 120 volts is applied to the winding 18, a current of 0.1 milliampere flows through the resistors and the 1K winding (totalling 6,730K) to produce 673 volts across the output lines 14, 15. Any desired voltage can be accepted across the output lines 14, 15 or produced across the output lines 14, 15 with the single desired voltage across the winding 18. Thus, the resistor network shown in FIGURE 2 can be used in place of the supply transformer, or in place of the control transformer, or in place of both the supply and control transformers. However, from one practical standpoint, it may be better to use the resistor network of FIGURE 2 only in place of the control transformer because the control transformer must not handle as much power as the supply transformer. The supply transformer provides power for the control transformer and the utilization device, but the control transformer provides only the regulator control voltage.

It will be seen that the invention provides a new and improved voltage regulating system for use with a voltage regulator having a designated value. While the invention has been described with transformers and resistors for transformation, it is to be understood that it may be possible to utilize other circuit elements such as capacitors. Also, other ranges of voltages can be provided by whatever transformation devices are used. Therefore, while the invention has been described with reference to particular embodiments, it is to be understood that modifications may be made without departing from the spirit of the invention or from the scope of the claims.

What we claim as new and desire to secure by Letters Patent of the United States is:

1. A system for supplying a selectable regulated voltage from a voltage regulator which provides a regulated output voltage of a designated value from an unregulated supply voltage in response to a control voltage supplied to said regulator, comprising a supply voltage transformation device having an input and a plurality of selectable outputs coupled to said input, means supplying said output voltage of said regulator to said input of said supply voltage transformation device, system output lines, means coupling predetermined ones of said selectable outputs of said supply voltage transformation device to said output lines for supplying a predetermined voltage to said output lines, a control voltage transformation device having a plurality of selectable inputs and an output coupled to said inputs, means coupling predetermined ones of said selectable inputs of said control voltage transformation device to said output lines, the ratio of said predetermined voltage produced by said supply voltage transformation device to said regulator output voltage being substantially equal to the ratio of the voltage supplied to said control voltage transformation device inputs to the voltage produced by said control voltage transformation device output, and means supplying said control voltage transformation device output to said regulator to provide a control voltage therefor.

2. A system for supplying a selectable regulated voltage from a voltage regulator which provides a regulated output voltage of a designated value at its regulated output from an unregulated supply voltage supplied to its unregulated input in response to a control voltage supplied to its control input, comprising a supply voltage transformation device having an input and a plurality of selectable outputs coupled to said input, means coupling said input of said supply device to said regulated output of said regulator, system output lines, means coupling predetermined ones of said selectable outputs of said supply device to said output lines for supplying a predetermined voltage to said output lines, a control voltage transformation device having a plurality of selectable inputs and an output coupled to said inputs, means coupling predetermined ones of said selectable inputs of said control device to said output lines, said predetermined outputs of said supply device and said predetermined inputs of said control device being selected so that the ratio of the voltage across said selected outputs of said supply device to the voltage across said input of said supply device is substantially equal to the ratio of the voltage across said selected inputs of said control device to the voltage across said output of said control device, and means coupling said output of said control device to said control input of said regulator.

3. A system for supplying a selectable regulated voltage from a voltage regulator which provides a regulated output voltage of a designated value at its regulated output from an unregulated supply voltage supplied to its unregulated input in response to a control voltage supplied to its control input, comprising a supply impedance transformation device having an input and a plurality of selectable outputs coupled to said input, means coupling said input of said supply device to said regulated output of said regulator, system output lines, means coupling predetermined ones of said selectable outputs of said supply device to said output lines for supplying a predetermined voltage to said output lines, a control impedance transformation device having a plurality of selectable inputs and an output coupled to said inputs, means coupling predetermined ones of said selectable inputs of said control device to said output lines, said predetermined outputs of said supply device and said predetermined inputs of said control device being selected so that the ratio of the impedance across said selected outputs of said supply device to the impedance across said input of said supply device is substantially equal to the ratio of the impedance across said selected inputs of said control device to the impedance across said output of said control device, and means coupling said output of said control device to said control input of said regulator.

4. A system for supplying a selectable regulated voltage from a voltage regulator which provides a regulated output voltage of a designated value at its regulated output from an unregulated supply voltage supplied to its unregulated input in response to a control voltage supplied to its control input, comprising a supply transformer having a primary winding and a plurality of selectable secondary windings coupled to said primary winding, means coupling said primary winding of said supply transformer to said regulated output of said regulator, system output lines, means coupling predetermined ones of said selectable secondary windings of said supply transformer in series between said output lines for supplying a predetermined voltage to said output lines, a control transformer having a plurality of selectable primary windings, corresponding to said secondary windings of said supply transformer, and having a secondary winding, corresponding to said primary winding of said supply transformer, coupled to said primary windings, means coupling predetermined ones of said selectable primary windings of said control transformer in series between said output lines, said predetermined secondary windings of said supply transformer and said predetermined primary windings of said control transformer corresponding and being selected so that the ratio of the voltage provided by said selected secondary windings of said supply transformer to the voltage across said primary winding of said supply transformer is substantially equal to the ratio of the voltage supplied across said selected primary windings of said control transformer to the voltage provided by said secondary winding of said control transformer, and means coupling said secondary winding of said control transformer to said control input of said regulator.

5. A system for supplying a selectable regulated voltage from a voltage regulator which provides a regulated output voltage of a designated value at its regulated output from an unregulated supply voltage supplied to its unregulated input in response to a control voltage supplied to its control input, comprising a supply transformer having a primary winding and a plurality of selectable secondary windings coupled to said primary winding, means coupling said primary winding of said supply transformer to said regulated output of said regulator, system output lines, means coupling predetermined ones of said selectable secondary windings of said supply transformer in series between said output lines for supplying a predetermined voltage to said output lines, a control voltage transformation device having a plurality of selectable impedance devices and an output coupled to said impedance devices, means coupling predetermined ones of said selectable impedance devices of said control device in series between said output lines, said predetermined secondary windings of said supply transformer and said predetermined impedance devices of said control device being selected so that the ratio of the voltage provided by said selected secondary windings of said supply transformer to the voltage across said primary winding of said supply transformer is substantially equal to the ratio of the voltage supplied across said selected impedance devices of said control device to the voltage provided by said output of said control device, and means coupling said output of said control device to said control input of said regulator.

No references cited.

LLOYD McCOLLUM, *Primary Examiner.*

W. E. RAY, *Assistant Examiner.*